United States Patent
Dussopt

(10) Patent No.: US 11,754,448 B2
(45) Date of Patent: Sep. 12, 2023

(54) THERMAL DETECTOR FOR DETECTING ELECTROMAGNETIC RADIATION COMPRISING AN ANTENNA AND A RESISTIVE LOAD THAT ARE COUPLED INDUCTIVELY

(71) Applicant: Commissariat à l'Energie Atomique et aux Energies Alternatives, Paris (FR)

(72) Inventor: Laurent Dussopt, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 17/654,472

(22) Filed: Mar. 11, 2022

(65) Prior Publication Data

US 2022/0291048 A1 Sep. 15, 2022

(30) Foreign Application Priority Data

Mar. 12, 2021 (FR) ...................................... 21 02503

(51) Int. Cl.
*G01J 5/24* (2006.01)
*G01J 5/08* (2022.01)
*G01J 5/20* (2006.01)

(52) U.S. Cl.
CPC ............... *G01J 5/24* (2013.01); *G01J 5/0837* (2013.01); *G01J 2005/202* (2013.01)

(58) Field of Classification Search
CPC .......... G01J 5/24; G01J 5/0837; G01J 5/0225; G01J 5/42; G01J 2005/202; G01J 2005/0077
See application file for complete search history.

(56) References Cited

U.S. PATENT DOCUMENTS 6,329,649 B1 * 12/2001 Jack ....................... H01Q 21/24
338/14
7,375,333 B1 5/2008 Bluzer et al.
(Continued)

FOREIGN PATENT DOCUMENTS

EP 2 246 677 A1 11/2010
EP 2 602 599 A1 6/2013

OTHER PUBLICATIONS

French Preliminary Search Report dated Dec. 2, 2021 in French Application 21 02503 filed on Mar. 12, 2021, 10 pages (with English Translation of Categories of Cited Documents & Written Opinion).

*Primary Examiner* — David P Porta
*Assistant Examiner* — Casey Bryant
(74) *Attorney, Agent, or Firm* — Oblon, McClelland, Maier & Neustadt, L.L.P.

(57) ABSTRACT

The invention relates to a thermal detector (1) for detecting electromagnetic radiation, comprising:
  a readout substrate (10);
  a membrane (20) suspended above the readout substrate, comprising: a thermometric transducer (23), and a resistive load (25) that is formed from a track that extends longitudinally to form a closed continuous loop;
  a collecting antenna (16), which is located away from the suspended membrane (20) and coupled to the resistive load (25), and which comprises a coupling track (16.1), which track is located plumb with the resistive load (25) and extends longitudinally to form an open continuous loop, thus permitting inductive coupling between the coupling track (16.1) and the resistive load (25).

15 Claims, 5 Drawing Sheets

(56) References Cited

U.S. PATENT DOCUMENTS

| | | |
|---|---|---|
| 8,373,123 B2 | 2/2013 | Ouvrier-Buffet |
| 9,052,231 B2 | 6/2015 | N'Guyen et al. |
| 2011/0057107 A1* | 3/2011 | Agnese .................... G01J 5/20 |
| | | 250/338.3 |

* cited by examiner

THERMAL DETECTOR FOR DETECTING ELECTROMAGNETIC RADIATION COMPRISING AN ANTENNA AND A RESISTIVE LOAD THAT ARE COUPLED INDUCTIVELY

TECHNICAL FIELD

The field of the invention is that of antenna-coupled thermal detectors suitable for detecting electromagnetic radiation, and in particular terahertz radiation the frequency range of which may be comprised between 0.3 and 3 THz (wavelength comprised between 0.1 and 1 mm). The invention is notably applicable to the fields of security, of non-destructive inspection, and of biomedical imaging.

PRIOR ART

Antenna-coupled thermal detectors are particularly suitable for detecting terahertz electromagnetic radiation. They may thus comprise an antenna for collecting the electromagnetic radiation, which antenna is coupled to a resistive load. The collecting antenna may rest on a readout substrate, and the resistive load may be placed in a membrane suspended above the readout substrate and thermally insulated therefrom. The suspended membrane also comprises a thermometric transducer, for example a thermistor material, placed in thermal contact with the resistive load.

Document EP2246677A1 describes one example of such an antenna-coupled thermal detector. It here comprises two crossed bowtie antennas suitable for collecting the electromagnetic radiation to be detected. A first bowtie antenna is located off the suspended membrane, and is coupled to the resistive load capacitively here via metal fins placed in the suspended membrane. The second bowtie antenna is placed in the suspended membrane, and is coupled to the resistive load resistively. However, the suspended membrane then comprises metal portions of large sizes, i.e. the second bowtie antenna but also the metal fins that ensure capacitive coupling with the first bowtie antenna, this negatively impacting the performance of the thermal detector in terms of thermal time constant, because of the high heat capacity of the suspended membrane.

SUMMARY OF THE INVENTION

The objective of the invention is to at least partially remedy the drawbacks of the prior art, and more particularly to provide an antenna-coupled thermal detector suitable for detecting electromagnetic radiation, and in particular terahertz radiation, that has an improved performance, notably in terms of thermal time constant, while having small lateral dimensions. Another objective of the invention is to provide such a thermal detector the suspended membrane of which has an improved mechanical strength and an improved reliability, and the fabrication process of which is simplified.

To this end, one subject of the invention is a thermal detector for detecting electromagnetic radiation at a main wavelength $\lambda_c$ comprised in a predefined spectral range, comprising:
 a readout substrate, comprising a readout circuit, and having a main plane;
 a membrane suspended above and thermally insulated from the readout substrate, comprising: a thermometric transducer electrically connected to the readout circuit; and a resistive load making thermal contact with the thermometric transducer and suitable for converting into heat the electromagnetic power received from a collecting antenna;
 the collecting antenna, which collecting antenna is suitable for collecting the electromagnetic radiation to be detected, is located away from the suspended membrane and is coupled to the resistive load with a view to transmitting thereto an electromagnetic power.

According to the invention, the resistive load is formed from a track that extends longitudinally to form a closed continuous loop. In addition, the collecting antenna comprises: a track referred to as the coupling track, which track is located plumb with the resistive load and extends longitudinally to form an open continuous loop, thus permitting inductive coupling between the coupling track and the resistive load; and a collecting lateral portion, which collecting lateral portion is connected to the coupling track and extends therefrom into a region not overhung by the suspended membrane.

In addition, the collecting antenna has maximum outside dimensions $D_{a,x}$, $D_{a,y}$ along two orthogonal axes in the main plane, each of the maximum outside dimensions $D_{a,x}$, $D_{a,y}$ of the collecting antenna being smaller than or equal to $\lambda_c/8$. Lastly, the coupling track has maximum outside dimensions $D_{pc,x}$, $D_{pc,y}$ along said orthogonal axes, each of the maximum outside dimensions $D_{pc,x}$, $D_{pc,y}$ of the coupling track being larger than or equal to 35% of the corresponding maximum outside dimension $D_{a,x}$, $D_{a,y}$ of the collecting antenna.

The main wavelength $\lambda_c$ of the electromagnetic radiation is comprised in a predefined spectral range of detection of the thermal detector. The main wavelength may be the central wavelength of the spectral range in question. Thus, when the thermal detector is suitable for detecting terahertz electromagnetic radiation the spectral range of which is comprised between 0.1 and 1 mm, the main wavelength $\lambda_c$ may be about 550 µm, to within plus or minus 10%, or even to within plus or minus 5%.

Moreover, a maximum outside dimension of the collecting antenna is a maximum distance along an axis in the main plane between two external borders of the collecting antenna that are opposite each other and that are furthest from each other, said distance being associated with a given thermal detector (and therefore located in the same detecting pixel when there is a matrix array of thermal detectors). The same definition applies to the maximum outside dimensions of the coupling track. Thus, the maximum outside dimension $D_{pc,x}$ of the coupling track along a first axis X is at least equal to 35% of the maximum outside dimension $D_{a,x}$ of the collecting antenna along the same axis X. The same goes for the maximum outside dimension $D_{pc,y}$ of the coupling track along a second axis Y (orthogonal to the axis X) relatively to the maximum outside dimension $D_{a,y}$ of the collecting antenna.

Thus, it should be clear that the fact that the coupling track (open loop) has maximum outside dimensions $D_{pc,x}$, $D_{pc,y}$ at least equal to 35% of those $D_{a,x}$, $D_{a,y}$ of the collecting antenna (which dimensions are defined by the lateral portions) allows the incident electromagnetic radiation to be effectively collected, even though the maximum outside dimensions $D_{a,x}$, $D_{a,y}$ of the antenna are small, and here at most equal to $\lambda_c/8$. In other words, the coupling track not only plays a role in inductive coupling to the resistive load, but also plays a role collecting a non-negligible share of the radiation to be detected.

In addition, the fact that the collecting antenna has a maximum outside dimensions $D_{a,x}$, $D_{a,y}$ at most equal to $\lambda_c/8$ makes it possible to prevent the coupling track from having excessively large dimensions. Thus, the AC electrical current generated by collection of the electromagnetic radiation and flowing through the coupling track is prevented from exhibiting parasitic resonances, which would be liable to degrade the quality of the inductive coupling to the resistive load.

In addition, it should be clear that the inductive coupling between the coupling track and the resistive load allows a substantial proportion of the collected electromagnetic power to be converted into heat dissipated by the resistive load into the thermometric transducer.

It is thus possible to greatly decrease the size of the detecting pixels, and thus to improve the detection resolution of the detecting device. Specifically, the size of the detecting pixels may thus be decreased by a factor of about 8 in both dimensions, thus improving resolution by a factor of about 64.

It will be noted that each of the maximum outside dimensions $D_{pc,x}$, $D_{pc,y}$ of the coupling track is advantageously smaller than or equal to 75% of the corresponding maximum outside dimension $D_{a,x}$, $D_{a,y}$ of the collecting antenna. Moreover, the width of the coupling track (i.e. its transverse dimension in the main plane) is preferably larger than or equal to 5% of the corresponding maximum outside dimension $D_{a,x}$, $D_{a,y}$ of the collecting antenna. It may be smaller than or equal to 80%, 50% or even 20% of the maximum outside dimensions $D_{pc,x}$, $D_{pc,y}$. Lastly, it will be noted that the width of the coupling track may not be large, in so far as the cross section of collection of the incident electromagnetic radiation is essentially defined by its maximum outside dimensions $D_{pc,x}$, $D_{pc,y}$ and not by the (overlap) area occupied by the coupling track in the main plane.

The following are certain preferred but nonlimiting aspects of this thermal detector.

The resistive load may comprise at least one resistive segment having a sheet resistance higher than or equal to 1 Ω/square.

The resistive segment of the resistive load may have a sheet resistance comprised between 1 Ω/square and 10 Ω/square.

The resistive load may be a continuously resistive track formed by the resistance segment alone. As a variant, it may be a locally resistive track formed from at least the resistive segment, and from at least one conductive segment having a sheet resistance lower than 1 Ω/square.

The resistive load and the coupling track may be spaced apart from each other along an axis orthogonal to the readout substrate by more than 5 μm.

The collecting lateral portion may comprise at least two distinct patterns, each connected to the coupling track, and suitable for collecting mutually orthogonal polarizations of the electromagnetic radiation to be detected.

The two patterns may be connected, one to one longitudinal end of the coupling track, and the other to the opposite longitudinal end.

The thermal detector may comprise a dielectric layer resting on the readout substrate, the collecting antenna resting on the dielectric layer, the suspended membrane being spaced apart from the collecting antenna by anchoring pillars made of at least one electrically conductive material.

The collecting antenna may be joined to a carrier lying above and away from the suspended membrane.

The coupling track and the collecting lateral portion may extend over the carrier in a co-planar manner.

The collecting lateral portion may extend over the carrier, and the coupling track may be spaced apart from the carrier in the direction of the suspended membrane and be connected to the collecting lateral portion by holding pillars.

The thermal detector may comprise a first collecting antenna resting on a dielectric layer resting on the readout substrate, and a second collecting antenna joined to a carrier lying above and away from the suspended membrane, the two collecting antennas being coupled to the resistive load by inductive coupling.

The thermal detector may be suitable for detecting terahertz electromagnetic radiation the spectral range of which is comprised between 0.3 and 3 THz, i.e. comprised between 0.1 and 1 mm.

The readout substrate may be made based on silicon.

The invention also relates to a detecting device comprising a matrix array of thermal detectors according to any one of the above features, wherein the thermal detectors of the matrix array have a periodic arrangement with a pitch $p_x$, $p_y$ along said two orthogonal axes in the main plane, each of the maximum outside dimensions $D_{pc,x}$, $D_{pc,y}$ of the coupling antenna being larger than or equal to 90%, or even 95%, of the corresponding pitch $p_x$, $p_y$ of the matrix array.

BRIEF DESCRIPTION OF THE DRAWINGS

Other aspects, aims, advantages and features of the invention will become more clearly apparent on reading the following detailed description of preferred embodiments thereof, this description being given by way of non-limiting example and with reference to the appended drawings, in which.

DETAILED DESCRIPTION OF PARTICULAR EMBODIMENTS

Figure 1A:
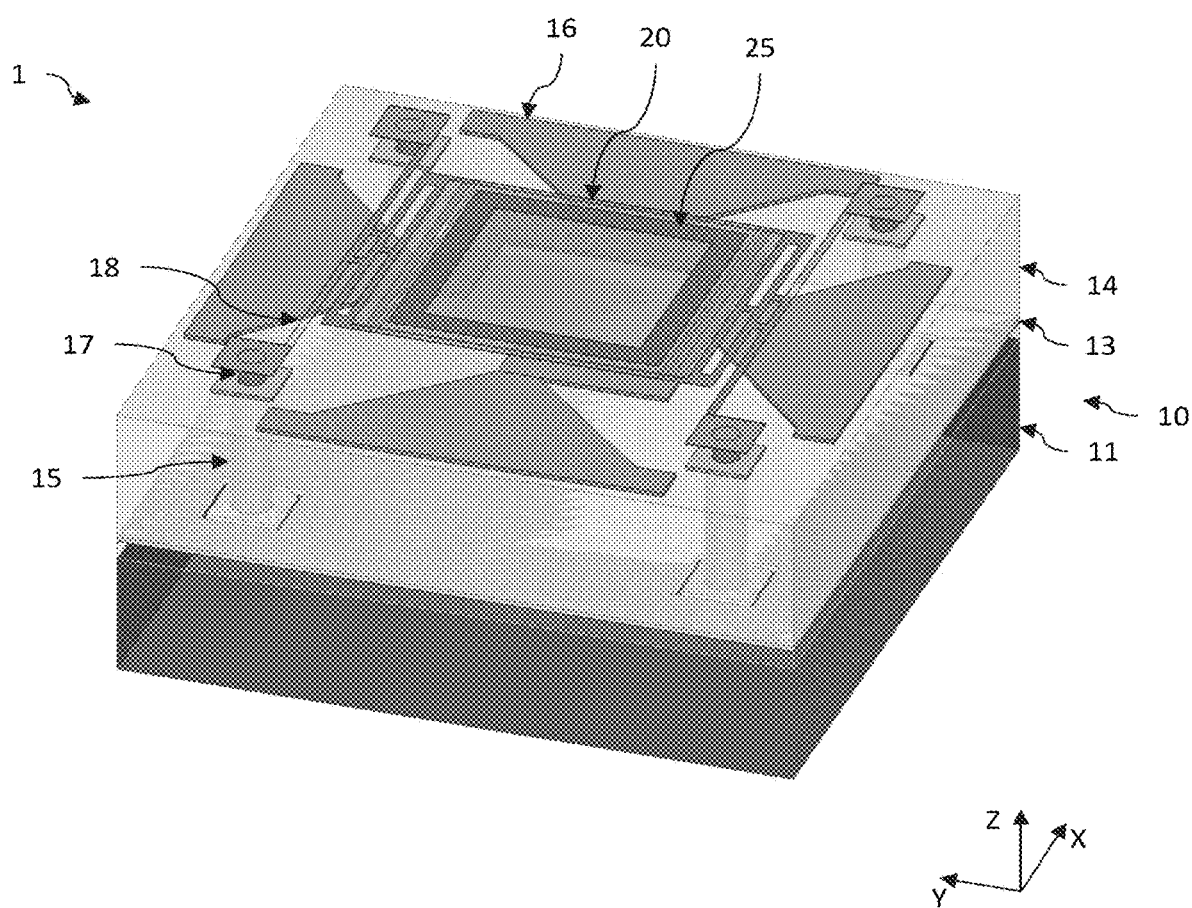
FIGS. 1A to 1C are schematic and partial views of a thermal detector according to one embodiment, in perspective (FIG. 1A), in perspective and exploded (FIG. 1B), and in cross section (FIG. 1C), respectively.

In the figures and in the remainder of the description, the same references have been used to designate identical or similar elements. In addition, the various elements have not been shown to scale so as to improve the clarity of the figures. Moreover, the various embodiments and variants are not mutually exclusive and may be combined with one another. Unless otherwise indicated, the terms "substantially", "about" and "of the order of" mean to within 10%, and preferably to within 5%. Moreover, the terms "comprised between . . . and . . . " and equivalents mean inclusive of limits, unless indicated otherwise.

The invention generally relates to an antenna-coupled thermal detector (and to a matrix array of thermal detectors) that is suitable for detecting electromagnetic radiation, in particular in the terahertz range a main wavelength $\lambda_c$ of which is comprised in a predefined spectral range extending from about 0.1 mm to 1 mm (spectral range comprised between about 0.3 and 3 THz). The main wavelength $\lambda_c$ is defined as being a central wavelength of the spectral range in question.

The thermal detector is an antenna-coupled thermal detector, i.e. it comprises a collecting antenna suitable for collecting the electromagnetic radiation to be detected. It also comprises a resistive load placed in a suspended membrane, the resistive load being thermally coupled to the thermometric transducer (i.e. making thermal contact therewith). In the context of the invention, the resistive load is formed from a track that extends longitudinally to form a closed continuous loop. In addition, the collecting antenna, which is located away from the suspended membrane, comprises a coupling track, which coupling track is located plumb with the resistive load and extends longitudinally to form an open continuous loop, thus permitting inductive coupling between the coupling track and the resistive load.

By track, what is meant is a thin layer forming a strip, i.e. a thin layer the length of which is larger than its width. Since the track is a thin layer, its thickness is smaller than its length and than its width. The track of the resistive load extends longitudinally to form a closed continuous loop, in the sense that it extends such as to close on itself. In contrast, the coupling track of the collecting antenna forms an open continuous loop in the sense that it is not closed on itself: electric charge may flow therethrough by making there-and-back trips between its two opposite longitudinal ends (AC electrical current).

Thus, because the collecting antenna is located away from the suspended membrane, and is coupled to the resistive load inductively, the suspended membrane has a low heat capacity and therefore a decreased thermal time constant. The performance of the thermal detector is therefore improved. In addition, since the collecting antenna is not located in the suspended membrane, the mechanical strength and reliability of the latter is improved, and the fabrication process of the thermal detector is simplified.

It will be noted here that the invention is applicable to various types of thermometric transducers. Thus, the thermometric transducer, which is an element that has an electrical property that varies with temperature, may be a thermistor material made for example of amorphous silicon or based on titanium or vanadium oxide, or may be a capacitor formed by a pyroelectric or ferroelectric material, a diode (p-n or p-i-n junction), or even a metal-oxide-semiconductor field-effect transistor (MOSFET).

Figure 1B:
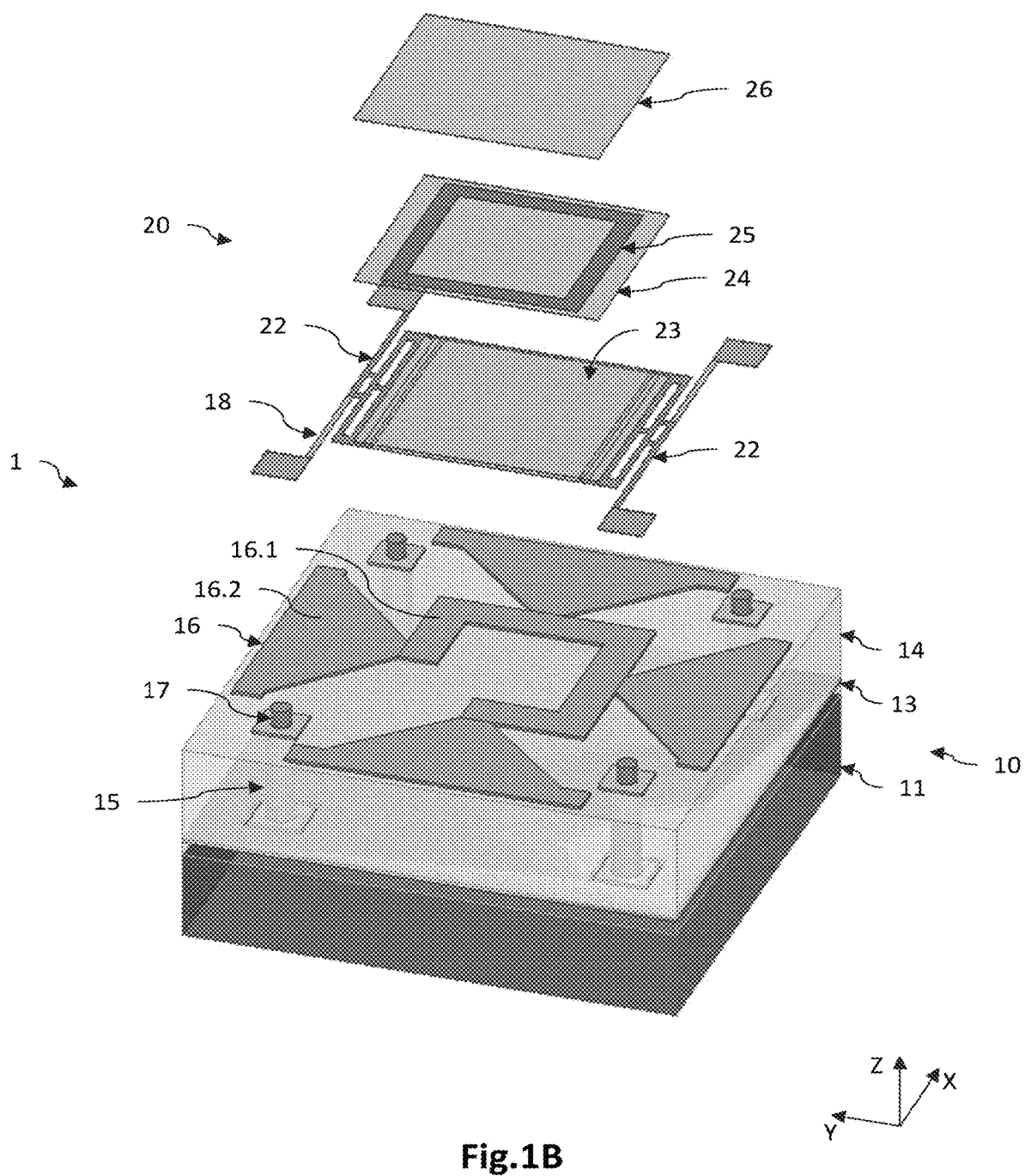
Figure 1C:
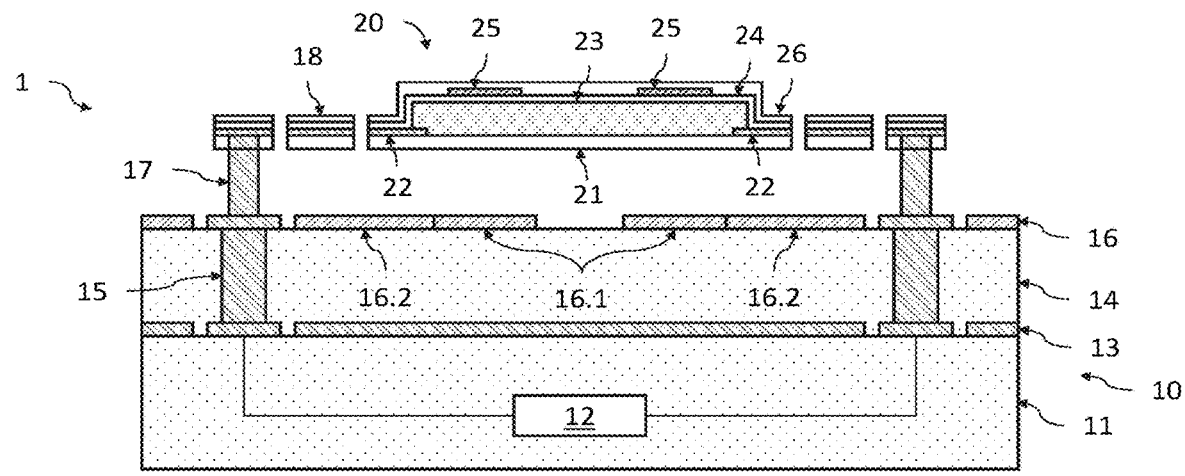

FIGS. 1A to 1C are schematic and partial views of an antenna-coupled thermal detector 1 according to one embodiment, in perspective (FIG. 1A), in perspective and exploded (FIG. 1B), and in cross section (FIG. 1C). FIG. 1C is a view of a section cut along a line and allowing various elements of the thermal detector 1 to be seen.

Here, a three-dimensional direct coordinate system XYZ is defined in which the XY-plane is substantially parallel to the plane of the readout substrate 10, the Z-axis being oriented in a direction that is substantially orthogonal to the plane of the readout substrate 10 in the direction of the suspended membrane 20; reference will be made to this coordinate system in the rest of the description. The terms "bottom" and "top" are to be understood to relate to positions of increasing distance from the readout substrate 10 in the +Z-direction.

The thermal detector 1 is here suitable for detecting terahertz radiation the wavelength of which is comprised between about 0.1 mm and 1 mm. It may belong to a matrix array of identical thermal detectors mutually arranged with a pitch of the order for example of 50 µm. Here, only one of the detecting pixels of the matrix array of thermal detectors has been shown. Generally, the thermal detectors (detecting pixels) are arranged periodically with a pitch $p_x$, $p_y$ along two orthogonal axes (here the X- and Y-axes) in the main XY-plane. In this example, the pitch is identical along the two X- and Y-axes, and is here equal to 50 µm.

The thermal detector 1 comprises an advantageously functionalized substrate 10, referred to as the readout substrate, which, in this example, is made based on silicon, and which comprises a readout circuit 12 allowing the thermal detectors to be controlled and read. The readout circuit 12 here takes the form of a CMOS integrated circuit located in a carrier substrate. It comprises conductive-line segments, for example metal conductive-line segments, that are separated from one another by a dielectric material, for example a silicon-based mineral material such as a silicon oxide $SiO_x$, a silicon nitride SiN, or an alloy thereof. It may also comprise active electronic elements (not shown), for example diodes or transistors, or passive electronic elements, for example capacitors, resistors, etc., that are connected by electrical interconnects to the thermal detector 1 on the one hand, and to a connection pad (not shown) on the other hand, the latter being intended to connect the thermal detector 1 to an external electronic device.

The thermal detector 1 comprises a reflector 13, which is made of at least one material that is reflective with respect to the terahertz radiation to be detected. It here rests on the top face of the readout substrate 10, but it may be spaced apart therefrom by a non-zero distance. As a variant, it may be formed from a segment of the conductive line of the last electrical interconnect level of the integrated CMOS circuit, and therefore be located in the readout substrate 10.

The readout substrate 10 and the reflector 13 are here covered by a dielectric layer 14 made of an electrically insulating material, such as silicon oxide. This dielectric layer 14 is optional, but allows the height of a quarter-wave cavity formed between the reflector 13 and the collecting antenna 16 to be adjusted. Its thickness is here substantially equal to $\lambda/4n$, where $\lambda$ is a reference wavelength of the terahertz radiation to be detected and where n is the refractive index of the dielectric layer 14.

The thermal detector 1 comprises connecting pillars 15, which are made of an electrically conductive material, which pass through the dielectric layer 14 and which ensure the electrical connection between the anchoring pillars 17 and the readout circuit 12.

The thermal detector 1 comprises a collecting antenna 16 suitable for collecting the terahertz radiation to be detected. It is located away from the suspended membrane 20 and is coupled to the resistive load 25 by inductive coupling. In this example, the detecting antenna rests on the readout substrate 10, here on the dielectric layer 14, but other configurations are possible as described below. It is spaced apart from the reflector 13 by a distance allowing its absorption of the terahertz radiation to be detected to be optimized. The detecting antenna is made of a metal of low electrical resistivity in order to limit losses as a result of Joule heating, and preferably has a sheet resistance lower than or equal to 1 Ω/square and a thickness comprised for example between 200 and 400 nm. It may be made of aluminum, of copper or of an alloy thereof, inter alia.

Figure 4A:
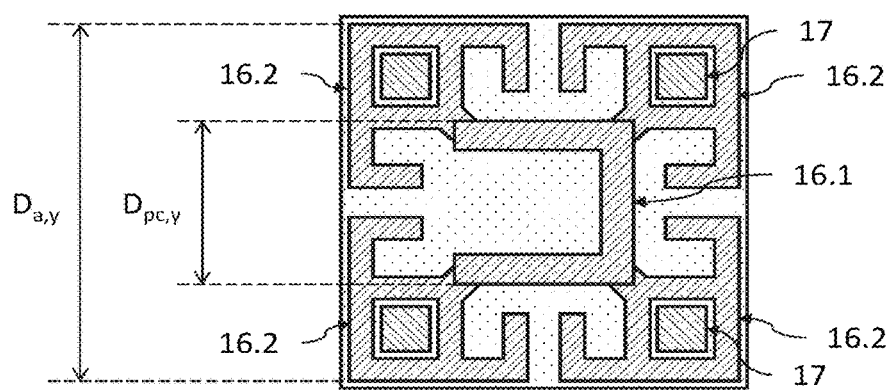
FIGS. 4A to 4C are schematic and partial views from above of a coupling antenna according to various variants of embodiment.
Figure 4B:
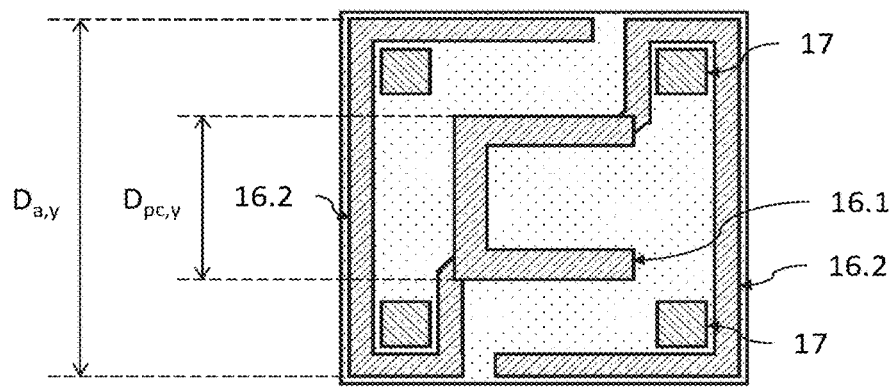
Figure 4C:
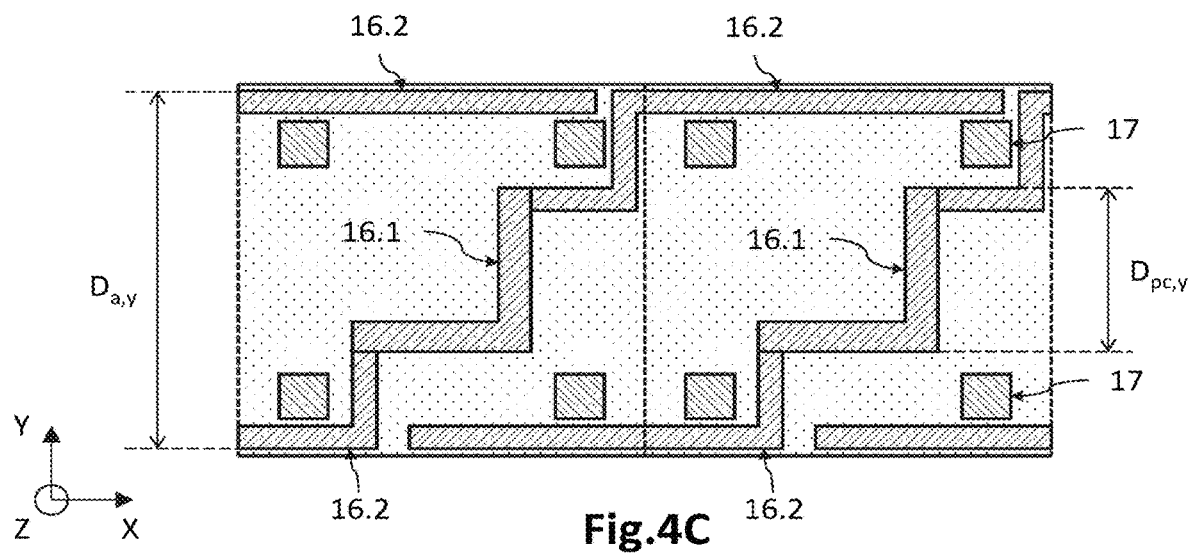

As shown in FIGS. 4A to 4C, the collecting antenna 16 has maximum outside dimensions $D_{a,x}$, $D_{a,y}$ along two orthogonal axes (here the X- and Y-axes) in the main XY-plane (only the dimension $D_{a,y}$ has been labeled). As indicated above, a maximum outside dimension of the collecting antenna 16 is a maximum distance along an axis in the main plane between two external borders of the collecting antenna that are opposite each other and that are furthest from each other, said distance being associated with a given thermal detector (and therefore located in the same detecting pixel). Each of these dimensions $D_{a,x}$, $D_{a,y}$ is preferably larger than or equal to 90%, or even 95%, of the corresponding pitch $p_x$, $p_y$ of the matrix array of thermal detectors.

In addition, each of the maximum outside dimensions $D_{a,x}$, $D_{a,y}$ of the collecting antenna 16 are smaller than or equal to $\lambda_c/8$, where $\lambda_c$ is the main wavelength of the electromagnetic radiation to be detected, which has a predefined spectral range (here extending from 0.1 mm to 1 mm in the case of terahertz radiation). The main wavelength $\lambda_c$ may thus be equal to 545 µm (550 GHz). There is thus a difference with examples of the prior art, in which the collecting antenna conventionally has a maximum dimension of the order of the main wavelength $\lambda_c$, i.e. here a dimension of the order of 500 µm.

By way of example, for a main wavelength $\lambda_c$ of 545 µm, and a pitch $p_x$, $p_y$ of 50 µm, the collecting antenna 16 may have maximum outside dimensions of the order of $\lambda_c/11$, and for example equal to 48×48 µm², this representing 96% of the pitch of the array.

The collecting antenna 16 is formed from a central track 16.1, which is referred to as the coupling track, and which is suitable for ensuring inductive coupling to the resistive load 25, and from a lateral portion 16.2, which is referred to as the collecting portion, and which is suitable for absorbing a substantial share of the incident terahertz radiation. The coupling track 16.1 and the collecting lateral portion 16.2 are integrally formed (i.e. continuously, without therebetween any discontinuity in material), and here made of the same metal of low electrical resistivity.

The coupling track 16.1 is located plumb with the track of the resistive load 25 extends longitudinally in the XY-plane to form an open continuous loop (open ring). It therefore has a shape, in the XY-plane, that is correlated with that of the resistive load 25, so that the flow of electric charge through the coupling track 16.1 and the flow of electric charge through the track of the resistive load 25 are substantially parallel to each other, thus improving the coefficient of coupling between the two tracks 16.1, 25. The coupling track 16.1 and the track of the resistive load 25 may have, in the XY-plane, a circular, oval or polygonal (here rectangular) shape.

The coupling track 16.1 is therefore a strip, i.e. a thin layer the length of which is larger than its width, that is continuous in so far that it is not formed of separate sections with a discontinuity in material between these sections. The coupling track 16.1 extends to form, in the XY-plane, an open loop, in the sense that the loop is not closed on itself: electric charge may flow therethrough by making there-and-back trips between its two opposite ends (AC electrical current).

Over all its length, it lies plumb with the resistive load 25. Its width may be larger, substantially equal, or smaller than that of the track of the resistive load 25. Moreover, it has a length, in a central region located plumb with the suspended membrane 20, that is at least equal to 50%, but obviously smaller than 100%, of the length of the track of the resistive load 25 (since the coupling track 16.1 forms an open loop).

As FIGS. 4A to 4C also shown, the coupling track 16.1 has maximum outside dimensions $D_{pc,x}$, $D_{pc,y}$ along the two orthogonal axes X and Y (only the dimension $D_{pc,y}$ has been labeled). As indicated above, a maximum outside dimension of the coupling track 16.1 is a maximum distance along an axis in the main plane between two external borders of the coupling track that are opposite each other and that are furthest from each other. Each of the maximum outside dimensions $D_{pc,x}$, $D_{pc,y}$ of the coupling track 16.1 is larger than or equal to 35% of the corresponding maximum outside dimension $D_{a,x}$, $D_{a,y}$ of the collecting antenna 16, and preferably smaller than or equal to 75%.

Thus, the inventors have observed that the coupling track 16.1 effectively participates, with the lateral portions 16.2, in the collection of the electromagnetic radiation to be detected. The coupling track 16.1 thus plays two roles, namely a role in inductive coupling to the resistive load 25, and a role in collecting radiation. In addition, since the collecting antenna has maximum dimensions that are small with respect to the main wavelength $\lambda_c$ (at most equal to $\lambda_c/8$), the coupling track 16.1 is prevented from being of large dimensions, as, if it were not, parasitic resonances could be generated in the AC electrical current, and the quality of the inductive coupling to the resistive load therefore degraded.

Moreover, the width of the coupling track 16.1 (i.e. its transverse dimension in the main plane) is preferably larger than or equal to 5% of the corresponding maximum outside dimension $D_{a,x}$, $D_{a,y}$ of the collecting antenna. It may be smaller than or equal to 80%, 50% or even 20% of the maximum outside dimensions $D_{pc,x}$, $D_{pc,y}$.

By way of example, for a main wavelength $\lambda_c$ of 545 µm, a pitch $p_x$, $p_y$ of 50 µm, and maximum outside dimensions $D_{a,x}$, $D_{a,y}$ of the collecting antenna 16 of 48×48 µm², the coupling track may have maximum outside dimensions of 30×22 µm² (i.e. about 62% and 46% of the maximum dimensions of the antenna 16), and a width of 4 µm (i.e. about 8% of the maximum dimensions of the antenna 16, and the order of 15% of the maximum dimensions of the coupling track 16.1).

The collecting lateral portion 16.2 is adapted to optimize the collection of the terahertz radiation to be detected. In addition, it is continuously connected to the coupling track 16.1. Thus, to maximize the collection of the incident radiation, it extends in the XY-plane from the coupling track 16.1 over an area of the detecting pixel that is not overhung by the suspended membrane 20. It comprises at least two similar or identical patterns designed to optimize the collection of the incident radiation to be detected, and for example the various components of its polarization. These patterns are advantageously connected one to one longitudinal end of the coupling track, and the other to the opposite longitudinal end. As illustrated in detail in FIG. 1B, the collecting lateral portion 16.2 is formed from four bowtie-type patterns placed pairwise symmetrically on either side of the coupling track 16.1. The patterns are separate from each other so as not to short-circuit the electrical current flowing through the coupling track 16.1. In this example, the bowtie patterns have, in the XY-plane, a triangular overall shape the width of which increases with distance from the coupling track 16.1. Thus, a large area of the bowtie patterns is located in a region not overhung by the suspended membrane 20, thus improving the collection of the incident radiation to be detected. Other overall shapes are possible certain of which are detailed below.

The thermal detector 1 comprises a thermometric membrane 20, which is suspended above the readout substrate 10 and here the dielectric layer 14 by anchoring pillars 17, and which is thermally insulated from the substrate by thermally insulating arms 18. The anchoring pillars 17 and the thermally insulating arms 18 also ensure the electrical connection of the thermistor segment 23 to the readout circuit 12 (here via the connecting pillars 15). The anchoring pillars 17 are made of at least one electrically conductive material, and are electrically connected to the subjacent connecting pillars 15 (and here extend vertically from the latter). The thermally insulating arms 18 comprise a layer made of at least one electrically conductive material, which extends from the anchoring pillars 17 to the suspended membrane 20, and forms an electrode for biasing the thermistor segment 23.

The suspended membrane 20 comprises a thermometric transducer, here a thermistor segment 23, electrically connected to the readout circuit 12 by the biasing electrodes 22. It rests on a dielectric bottom layer 21 and makes contact with the biasing electrodes 22. It is covered by a dielectric intermediate layer 24. The resistive load 25 here rests on the dielectric intermediate layer 24, and is coated by a protective top layer 26. Other arrangements of these elements are of course possible.

The resistive load 25 is designed to dissipate heat via Joule heating when it is passed through by an electrical current. It is arranged in the suspended membrane 20 so as to make thermal contact with the thermistor segment 23 (thermal coupling), so that the heat dissipated by Joule heating leads to an increase in the temperature of the thermistor segment 23. It is here spaced apart and electrically insulated from the thermistor segment 23 by the dielectric intermediate layer 24, which may for example be made of a silicon nitride or oxide and may have a thickness for example of the order of about 10 nm. However, other arrangements of the resistive load 25 with respect to the thermistor segment 23 are possible. It may thus be located under the thermistor segment 23.

The resistive load 25 is a track that extends in the XY-plane to form a closed continuous loop. It therefore extends longitudinally such as to close on itself. It is located plumb with the coupling track 16.1 of the collecting antenna 16 so as to optimize the coefficient of coupling between the two tracks 16.1, 25.

The resistive load 25 comprises at least one resistive segment having a sheet resistance higher than or equal to 1 Ω/square, and preferably comprised between 1 Ω/square and 10 Ω/square so as to optimize the inductive coupling and therefore the dissipation via Joule heating. In a configuration referred to as the continuous configuration (FIG. 2A), the resistive load 25 is a continuously resistive track formed by the resistive segment alone. The resistive load 25 then has, over its entire length, the sheet resistance advantageously comprised between 1 Ω/square and 10 Ω/square. In a configuration called the localized configuration (FIG. 2B), the resistive load 25 comprises at least the resistive segment 25.1 the sheet resistance of which is advantageously comprised between 1 Ω/square and 10 Ω/square and at least one conductive segment 25.2 the sheet resistance of which is lower than 1 Ω/square.

The resistive segment of the resistive load 25 may for example be made of niobium, or even of titanium, of titanium nitride, or indeed of one of the alloys thereof. It has a thickness for example comprised between about 20 nm and 200 nm, or even less depending on the material. Moreover, the resistive load 25 is spaced apart from the coupling track 16.1 along the Z-axis by a distance of at most 5 μm. It will be noted that the resistive load 25 has a sheet resistance far lower than that of the electrodes 22. Thus, the sheet resistance of the resistive load 25 is preferably of the order of 1 to 10 Ω/square in order to optimize the inductive coupling, whereas that of the electrodes 22 may be of the order of 200 Ω/square so as to limit thermal conduction.

Figure 2A:
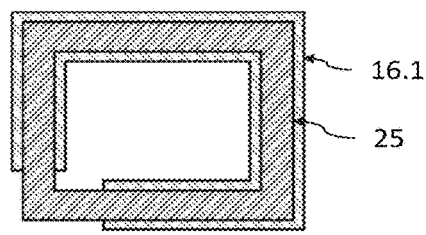
FIGS. 2A and 2B are schematic and partial views from above of the coupling track of the collecting antenna and of the resistive load, according to two variants of embodiment, in which variants the resistive load is a continuously resistive track (FIG. 2A) or is a locally resistive track formed from resistive segments connected to one another by conductive segments (FIG. 2B)
Figure 2B:
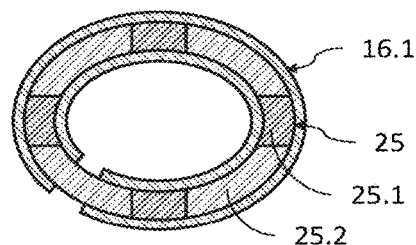

FIGS. 2A and 2B are schematic and partial views from above of the resistive load 25 and of the coupling track 16.1 of the collecting antenna 16, according to two variants of embodiment.

In the example of FIG. 2A, the resistive load 25 has a configuration referred to as the continuous configuration (continuously resistive track), in so far as the track is made, over its entire length, of at least one metal of high electrical resistivity (sheet resistance higher than or equal to 1 Ω/square). Moreover, in this example, it extends in the XY-plane to form a closed continuous loop that has a rectangular shape. The coupling track 16.1 here has a width larger than that of the resistive load 25 and over its entire length lies plumb with the track of the resistive load 25.

In the example of FIG. 2B, the resistive load 25 has a configuration referred to as the localized configuration (locally resistive track), in so far as it comprises at least one resistive segment, and here four resistive segments 25.1, made of at least one metal of high electrical resistivity (sheet resistance higher than or equal to 1 Ω/square and preferably comprised between 1 and 10 Ω/square), and for example of TiN of a thickness of 7 to 20 nm, and conductive segments 25.2 made of at least one metal of low electrical resistivity (sheet resistance lower than 1 Ω/square), and for example of aluminum, which connect to one another the resistive segments 25.1. Thus, the track of the resistive load 25 indeed has a closed-continuous-loop shape. Moreover, in this example, the tracks 16.1, 25 have in the XY-plane an oval shape.

Thus, in operation, the electromagnetic radiation to be detected is collected by the collecting antenna 16 and in particular by the collecting lateral portion 16.2 connected to the coupling track 16.1. The AC electrical current induced in the coupling track 16.1 generates a magnetic field oriented orthogonally to the XY-plane. By inductive coupling, this magnetic field generates an electrical current in the track of closed-loop shape of the resistive load 25. This electromagnetic power received by the resistive load 25 is then converted into heat that is transmitted, via dissipation by Joule heating, to the thermistor segment 23 and thus causes it to heat up. It will be noted that the coupling between the coupling track 16.1 and the resistive load 25 is here inductive because of the relative arrangement and shape of said coupling track and resistive load, but this does not exclude that it might also comprise a capacitive contribution.

Such a thermal detector 1 thus has an improved performance with respect to that of an antenna-coupled thermal detector 1 in which capacitive coupling is employed. Specifically, the suspended membrane 20 comprises no metal portions of large area (capacitive-coupling fins, absorption antenna, etc. as described in the aforementioned prior-art document), this decreasing its heat capacity, and therefore improving the thermal time constant of the thermal detector 1 according to the invention. In addition, in so far as it is not necessary to produce metal portions of large area in the suspended membrane 20, the fabrication process is simplified. Lastly, the suspended membrane 20 is mechanically more robust since its mass is lower and none of the parts thereof protrude from the XY-plane. Moreover, the thermal detector 1 has an improved sensitivity at equal pixel size, in so far as the collecting antenna 16 may resonate at a longer wavelength than in the antenna-coupled thermal detectors of the prior art (notably EP2246677A1 and U.S. Pat. No. 6,329,655B1). Specifically, this is achieved via the coupling track 16.1 of open-loop shape that connects the patterns of the coupling lateral portion 16.2, these patterns advantageously being connected to the track 16.1 at its opposite longitudinal ends. The maximum distance of travel of electric charge between the two ends the furthest apart of the collecting antenna 16 is increased. The thermal detector may thus here detect sub-terahertz radiation, for example at 750 GHz or 500 GHz.

By way of example, the thermal detector 1 illustrated in FIG. 1A belongs to one pixel of a detecting matrix array, which has a lateral dimension of about 50 µm. The dielectric layer 14 may be a silicon oxide of a thickness of about 11 µm. The suspended membrane 20 may be spaced apart from the collecting antenna 16 by a distance of about 1 to 3 µm, and typically of the order of one tenth of the largest dimension of the track of the resistive load 25. In this example, the latter has a rectangular shape of 28×20 µm sidelength. Simulation of this thermal detector 1 by a simulation software package such as Ansys HFSS shows that the absorption coefficient is of the order of 26% for linearly polarized incident electromagnetic radiation at 540 GHz with the linear polarization oriented along a diagonal of the detecting pixel.

In addition, such an antenna-coupled thermal detector 1 according to the invention may have a performance such that a substantial proportion of the electromagnetic power collected by the collecting antenna 16 is converted into heat by the resistive load 25 and dissipated in the thermometric transducer 23.

Figure 3A:
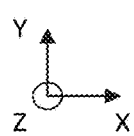
FIG. 3A is a schematic and partial perspective view of a coupling track of the collecting antenna and of the resistive load according to one variant of embodiment.
Figure 3A:
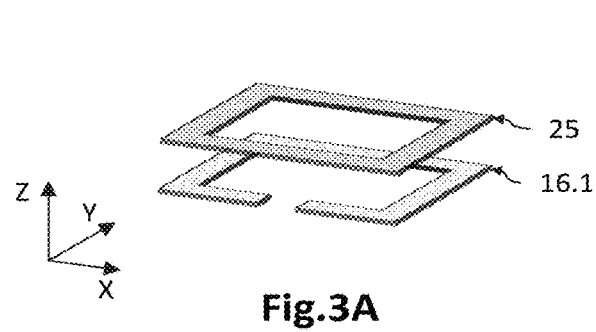
Figure 3B:
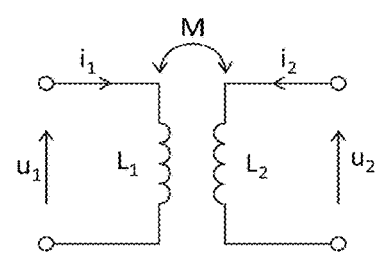
FIG. 3B illustrates an equivalent circuit diagram.

In this respect, FIG. 3A is a schematic and partial perspective view of a track of the resistive load 25 in continuous configuration (continuously resistive track) located plumb with a coupling track 16.1 of the collecting antenna 16. FIG. 3B illustrates an equivalent circuit diagram of these two inductively coupled tracks 16.1, 25.

In this example, the two tracks 16.1, 25 form square continuous loops in the XY-plane, of outside dimensions of 20×20 µm, of a width of 2 µm and of a thickness of 350 nm, and are spaced apart from each other along the Z-axis by 2 µm. The coupling track 16.1 is open and is connected to a generator of an AC electrical current equivalent to the collection of electromagnetic radiation at 750 GHz, and the track of the resistive load 25 has a sheet resistance of 5 Ω/square.

The equivalent circuit diagram comprises two electrical circuits comprising coils of inductances $L_1$, $L_2$. The circuit 1 corresponds to the coupling track 16.1 and is connected to an electrical generator, and the circuit 2 is connected to a resistive load. This circuit diagram is simplified and each electrical circuit may especially be completed by a resistor in series with the inductor and characterizing its internal resistance, and by a capacitor connected in parallel with the resistor and inductor. The two coils are coupled to each other inductively, this coupling being characterized by the mutual inductance M and by a coupling coefficient k such that $k=M/\sqrt{L_1 L_2}$. The equivalent electrical model is here written:

$$u_1 = L_1 \frac{di_1}{dt} + M \frac{di_2}{dt}$$
$$u_2 = L_2 \frac{di_2}{dt} + M \frac{di_1}{dt}$$

The behavior of these two tracks coupled to each other inductively may be simulated by means of a software package for simulating electromagnetic field, such as the software package Ansys HFSS. In the case of injection of an AC electrical current into port 1 corresponding to a frequency of 750 GHz, the power balance indicates that for 100% power delivered to port 1, 58% of the delivered power is reflected and 42% of the delivered power is actually collected. The reflected power results from the impedance mismatch of port 1 and will possibly be able to be decreased by optimizing the impedance of port 1. Subsequently, 9% of the delivered power is dissipated by Joule heating in the coupling track 16.1 and 9% is also dissipated in the resistive track, and 24% is transmitted to port 2 via inductive coupling and will be able to be dissipated. Thus, the total power dissipated by Joule heating by the resistive track is 33% of the delivered initial power (9%+24%).

It should therefore be clear that the inductive coupling between the two tracks 16.1, 25 of the thermal detector 1 allows a substantial share of the electromagnetic power collected by the collecting antenna 16 of such a thermal detector 1 to be transmitted and converted.

Particular embodiments have just been described. Various modifications and variants will be obvious to anyone skilled in the art.

FIGS. 4A to 4C are schematic and partial views from above of a collecting antenna 16 of a thermal detector 1 according to various variants of embodiment. Other shapes are of course possible.

In the example of FIG. 4A, the collecting antenna 16 comprises a U-shaped coupling track 16.1, and a collecting lateral portion 16.2 formed from four identical patterns. Each pattern extends from one corner or one end of the coupling track 16.1, and has a substantially triangular shape. Thus, tracks extend around the anchoring pillars 17 and along the border of the detecting pixel.

In the example of FIG. 4B, the collecting antenna 16 also comprises a U-shaped coupling track 16.1, and a collecting lateral portion formed from two identical patterns. Each pattern extends from one corner or one end of the coupling track 16.1, and is formed from a track that skirts one anchoring pillar and extends along a plurality of sides of the detecting pixel.

In the example of FIG. 4C, the collecting antenna 16 also comprises a coupling track 16.1 having two strips orthogonal to each other, and a collecting lateral portion 16.2 formed from two tracks that each extend along one side of the detecting pixel in question, and along the side of adjacent detecting pixels.

Figure 5A:
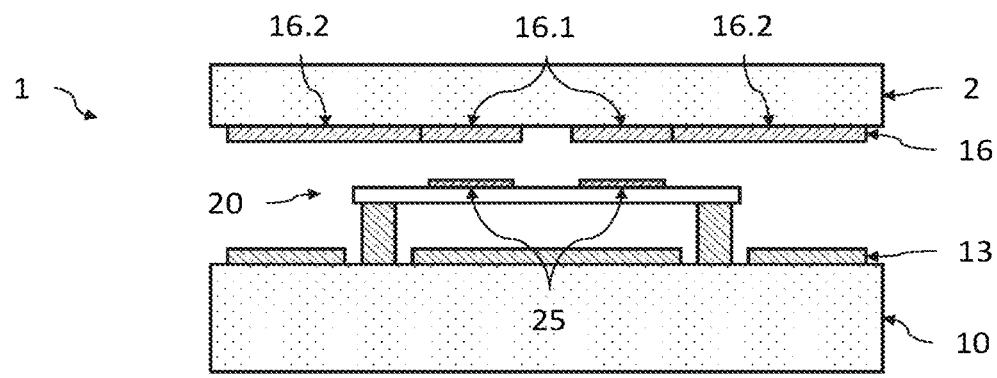
FIGS. 5A to 5C are schematic and partial cross-sectional views of a thermal detector according to various variants of embodiment, in which variants a coupling antenna is located away from and above the suspended membrane.
Figure 5B:
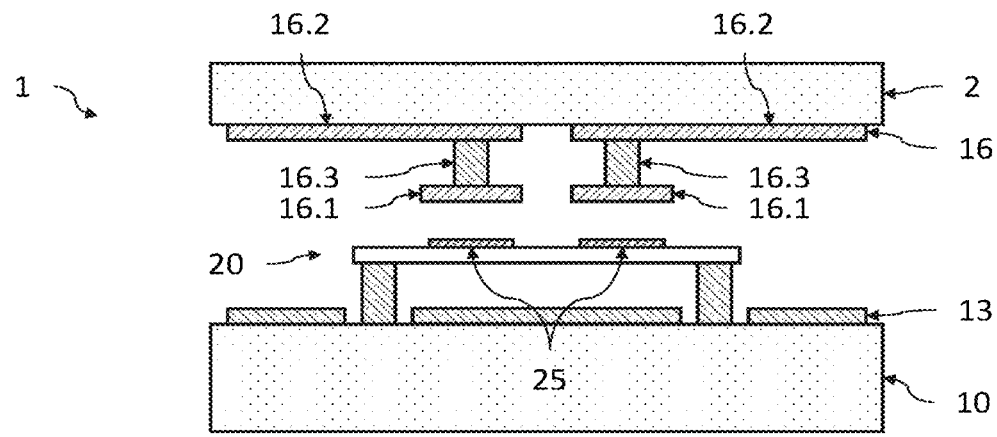
Figure 5C:
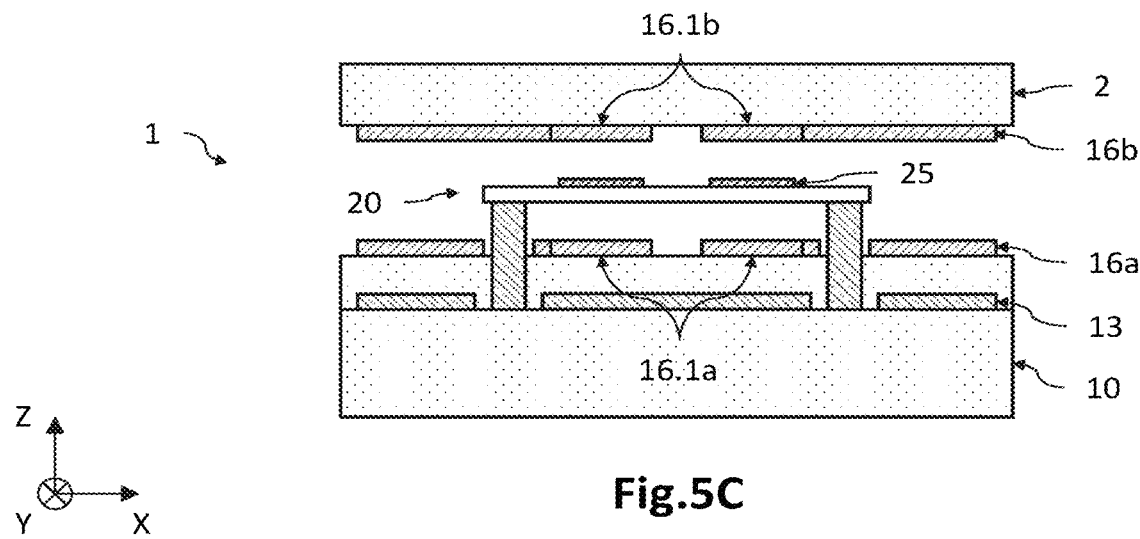

FIGS. 5A to 5C are schematic and partial cross-sectional views of a thermal detector 1 according to various variants of embodiment, which differ from one another in the arrangement of the collecting antenna with respect to the readout substrate 10. Other shapes are of course possible.

In the example of FIG. 5A, the collecting antenna does not rest on the readout substrate 10, but is joined to and held above the suspended membrane 20 by a carrier 2 that may also encapsulate the thermal detector 1 or the matrix array of thermal detectors in a low-pressure or vacuum cavity. In this example, the collecting antenna 16 being further from the reflector 13 than in the case of FIG. 1A, the dielectric layer 14 may be omitted. Here, the coupling track 16.1 and the collecting lateral portion 16.2 extend in a coplanar manner over the carrier 2.

In the example of FIG. 5B, the collecting antenna 16 is also joined to a carrier 2 that holds it above the absorbing membrane. It comprises a collecting lateral portion 16.2 that extends over the carrier 2, and a coupling track 16.1 that is spaced apart from the carrier 2 in the direction of the membrane 20 and connected to the collecting lateral portion 16.2 by holding pillars 16.3 that are made of a metal.

In the example of FIG. 5C, the thermal detector 1 comprises two collecting antennas 16a, 16b, a bottom antenna 16a that rests on the readout substrate 10, under the suspended membrane 20, and a top antenna 16b that is joined to a carrier 2 that holds it above the suspended membrane 20. The two collecting antennas 16a, 16b are inductively coupled to the resistive load 25.

The invention claimed is:

1. A thermal detector for detecting electromagnetic radiation at a main wavelength $\lambda_c$ comprised in a predefined spectral range, comprising:
    a readout substrate, comprising a readout circuit, and having a main plane;
    a membrane suspended above and thermally insulated from the readout substrate, comprising: a thermometric transducer electrically connected to the readout circuit; and a resistive load making thermal contact with the thermometric transducer and configured to convert into heat the electromagnetic power received from a collecting antenna;
    the collecting antenna, configured to collect the electromagnetic radiation to be detected, being located away from the suspended membrane and being coupled to the resistive load with a view to transmitting thereto an electromagnetic power;
    wherein:
        the resistive load is formed from a track that extends longitudinally to form a closed continuous loop;
        the collecting antenna comprises:
            a coupling track, being located plumb with the resistive load and extending longitudinally to form an open continuous loop, thus permitting inductive coupling between the coupling track and the resistive load;
            a collecting lateral portion, being connected to the coupling track and extending therefrom into a region not overhung by the suspended membrane,
        the collecting antenna having maximum outside dimensions along two orthogonal axes in the main plane, each of the maximum outside dimensions of the collecting antenna being smaller than or equal to $\lambda_c/8$;
        the coupling track having maximum outside dimensions along said orthogonal axes, each of the maximum outside dimensions of the coupling track being larger than or equal to 35% of the corresponding maximum outside dimension of the collecting antenna.

2. The thermal detector as claimed in claim 1, wherein the resistive load comprises at least one resistive segment having a sheet resistance higher than or equal to 1 $\Omega$/square.

3. The thermal detector as claimed in claim 2, wherein the resistive segment of the resistive load has a sheet resistance comprised between 1 $\Omega$/square and 10 $\Omega$/square.

4. The thermal detector as claimed in claim 2, wherein the resistive load is a continuously resistive track formed by the resistive segment alone, or is a locally resistive track formed from at least the resistive segment and from at least one conductive segment having a sheet resistance lower than 1 $\Omega$/square.

5. The thermal detector as claimed in claim 1, wherein the resistive load and the coupling track are spaced apart from each other along an axis orthogonal to the readout substrate by more than 5 µm.

6. The thermal detector as claimed in claim 1, wherein the collecting lateral portion comprises at least two distinct patterns, each connected to the coupling track, and configurated to collect mutually orthogonal polarizations of the electromagnetic radiation to be detected.

7. The thermal detector as claimed in claim 6, wherein the two patterns are connected, one to one longitudinal end of the coupling track, and the other to the opposite longitudinal end.

8. The thermal detector as claimed in claim 1, comprising a dielectric layer resting on the readout substrate, the collecting antenna resting on the dielectric layer, the suspended membrane being spaced apart from the collecting antenna by anchoring pillars made of at least one electrically conductive material.

9. The thermal detector as claimed in claim 1, wherein the collecting antenna is joined to a carrier lying above and away from the suspended membrane.

10. The thermal detector as claimed in claim 9, wherein the coupling track and the collecting lateral portion extend over the carrier in a co-planar manner.

11. The thermal detector as claimed in claim 9, wherein the collecting lateral portion extends over the carrier, and the coupling track is spaced apart from the carrier in the direction of the suspended membrane and is connected to the collecting lateral portion by holding pillars.

12. The thermal detector as claimed in claim 1, comprising a first collecting antenna resting on a dielectric layer resting on the readout substrate, and a second collecting antenna joined to a carrier lying above and away from the suspended membrane, the two collecting antennas being coupled to the resistive load by inductive coupling.

13. The thermal detector as claimed in claim 1, said thermal detector being suitable for detecting terahertz electromagnetic radiation the spectral range of which is comprised between 0.1 and 1 mm, the main wavelength $\lambda_c$ being a central wavelength of said spectral range.

14. The thermal detector as claimed in claim 1, wherein the readout substrate is made based on silicon.

15. A detecting device comprising a matrix array of thermal detectors as claimed in claim 1, wherein the thermal detectors of the matrix array have a periodic arrangement with a pitch along said two orthogonal axes in the main plane, each of the maximum outside dimensions of the coupling antenna being larger than or equal to 90% of the corresponding pitch of the matrix array.

* * * * *